Aug. 19, 1941.   L. POLLACK   2,252,898
MULTILAYER POLARIZING BODY AND METHOD OF MANUFACTURE
Filed Feb. 9, 1938
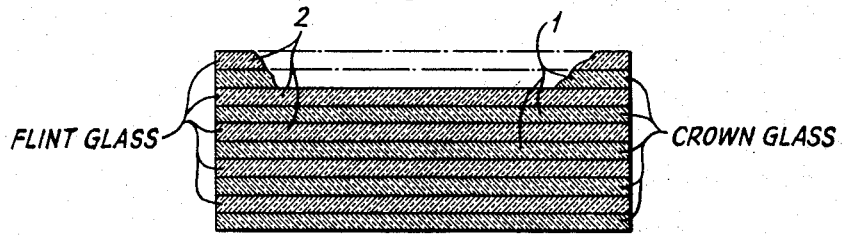
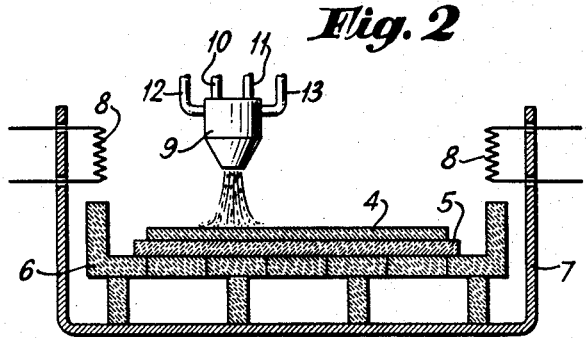
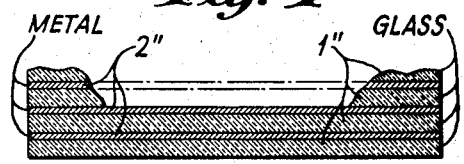
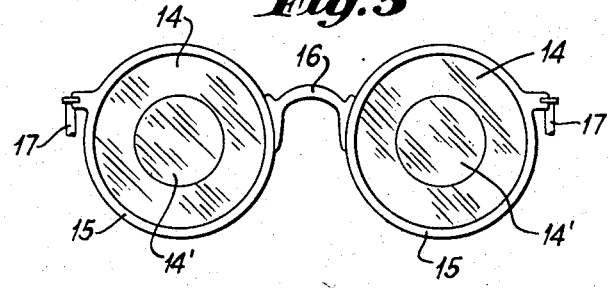
INVENTOR.
Leon Pollack

UNITED STATES PATENT OFFICE 2,252,898

MULTILAYER POLARIZING BODY AND METHOD OF MANUFACTURE

Leon Pollack, Brooklyn, N. Y.

Application February 9, 1938, Serial No. 189,524

5 Claims. (Cl. 88—65)

The present invention relates to light polarizing bodies and to methods of manufacturing same. More particularly, the invention relates to a multi-layer light polarizing body, and specifically to such a body wherein each layer consists of optically transparent material which is deposited in suitable manner, as for example by spraying or flowing.

One of the simplest known methods of securing polarized light is by transmitting same through a pile of glass plates placed at a polarizing angle. As the light passes through each plate in the pile, the unpolarized portion of light suffers a resolution into two polarized components at right angles to each other, one of which is the reflected component and the other the transmitted or refracted component. By increasing the number of glass plates, it is known that the intensity of the reflected polarized light is increased and also the completeness of the polarization of the light transmitted through the plates is also increased. Usually eight or ten such plates are sufficient to completely polarize the transmitted light. These plates are preferably made as thin as possible in order to avoid loss of light by absorption.

One difficulty in this known method of securing polarized light is that the pile of plates is too thick for use in spectacle lenses.

The present invention overcomes the foregoing difficulty, and has for one of its objects to provide a multi-layer light polarizing body made entirely from glass which is thin enough to be used in spectacle lenses.

Another object is to provide a novel form of polarizing body made from a multiplicity of optically transparent layers secured together, wherein each layer is formed by a spraying operation.

A further object is to provide a process for manufacturing a light polarizing body made from a plurality of superposed deposited layers of materials having optical properties.

Generally speaking, the invention comprises forming a light polarizing body by spraying or otherwise depositing layers of optically transparent material of suitable thickness one upon another in superimposed fashion.

In accordance with one embodiment of the invention, layers of one kind of optical glass alternate with layers of another kind of optical glass to form my light polarizer body. As an illustration, layers of crown glass having an index of refraction of 1.5 may alternate with layers of flint glass having an index of refraction of 1.7.

In accordance with another embodiment of my invention, layers of one type of transparent plastic having optical properties, such as synthetic resin plastic, alternate with layers of another type of plastic having a different index of refraction to form my light polarizer body.

In accordance with a further embodiment of my invention, layers of optical glass alternate with sprayed, sputtered or painted layers of transparent metal having a different index of refraction than the glass.

Other objects, advantages and features will appear from a reading of the following detailed description which is accompanied by a drawing, wherein:

Fig. 1 is a vertical section, greatly magnified, through one form of multi-layer light polarizing body made in accordance with the principles underlying the present invention;

Fig. 2 is a vertical section of a furnace wherein the fabrication of the multi-layer polarizing composite body of Fig. 1 may be carried out;

Fig. 3 is a vertical section of another embodiment, greatly magnified, of multi-layer polarizing body made in accordance with the invention;

Fig. 4 is a vertical section of a third embodiment, greatly magnified, of my improved light polarizing body; and Fig. 5 illustrates in perspective, and by way of example only, one manner which a light polarizing body of my invention may be used as a spectacle lens.

Referring to Fig. 1, there is shown, greatly magnified for the purpose of illustration, a multi-layer polarizing body comprising alternate layers 1, 2 of sprayed glass having different indexes of refraction. These superimposed sprayed layers may comprise, for example, alternate layers of crown glass 1 and flint glass 2 whose respective indexes are 1.5 and 1.7. The thickness of these layers may vary, as desired, although by way of example, they may each be of the order of .005 inch, in which case a light polarizing body of, let us say, twelve layers will have a total thickness of the order of .06 inch. This total thickness will of course vary with the thickness of each layer and the number of layers employed in the light polarizer. From what has been given above, it will be evident that my light polarizing body can be made to have extremely small thicknesses never heretofore obtained. It is to be distinctly understood, however, that the polarizing body of my invention is not limited to any particular thickness of layer or any particular number of layers.

Due to the fact that the adjacent layers of glass in my polarizer have different indexes, a ray of light passing through the layers of the polarizer body will take on the appearance of a wavy or zig-zag line within the polarizer per se, although to the user the transmitted light will appear perfectly straight. Because of this, my multi-layer polarizer simulates the layers in the crystalline lens of the eye, which also have different indexes of refraction.

In the fabrication of my light polarizer body of Fig. 1, I may employ glass of high grade, clear optical properties which is first reduced to a fine powder, then heated to a temperature above its melting point, and subsequently may be deposited by a nozzle which connects with a burner. I am not claiming any particular method of spraying glass, since this is well known and described in the literature; note for example, United States Letters Patents Nos. 1,869,163, Niedergesass, patented July 26, 1932; 1,536,821, Devers, patented May 5, 1935; 1,566,911, Nelson, patented December 22, 1925; 1,930,327, Thomson, patented October 10, 1933; and 1,930,340, Ellis et al., patented October 10, 1933.

One particular method of spraying glass is shown in Fig. 2. A layer of glass 4 is shown being deposited by spraying upon a support 5 consisting of suitable refractory material resting on a support of fire brick 6. Particles of the glass are caused to impinge upon support 5 by the burner 9 and are fused together by the flame. By repeated traverse of the burner over the initial layer of glass there may be built up any desired thickness of layer. The burner 9 may be supplied with combustible and combustion-supporting gases through conduits 10, 11 and with finely divided silica conveyed by one of the gases from a feeding device which is not shown. Separate conduits 12, 13 convey cooling water to the burner. The deposition of the silica occurs in a suitable furnace comprising an enclosure 7, containing a suitable heating means, as conventionally indicated by the electric heaters 8, 8. The rate of feed of the silica powder and the gas and the rate of traverse of the flame are regulated to produce the desired density and transparency in the product.

Inasmuch as I employ alternate layers of different glass, I prefer to use two different burners 9, one for each kind of layer, to be used alternately.

In the process of manufacture, it is desired that the planes of cleavage between adjacent layers be as smooth as possible. In actual practice, there will be no clear cleavage plane between layers since each layer will fuse to its adjacent layers, thus producing a completed composite body of unitary structure. Where it is desired, therefore, to obviate dispersion of the light between layers, I propose to cool off my polarizing body after each layer is deposited, and to polish the surface thereof before the next layer is added. Where this is done, each layer should be deposited with a greater thickness than is desired in the finished product, and the surplus polished off. This polishing step is not necessary in all cases, however, depending upon the purpose for which the polarizing body is to be used.

Fig. 3 illustrates a multi-layer polarizing arrangement employing alternate layers of sprayed or suitably deposited plastic materials having different indexes of refraction. These plastics are chosen to have desired optical properties and may comprise synthetic plastic resins.

One suitable resin which may be employed is water-white and clear as ordinary crown glass. It does not break when dropped and is exceedingly tough. It is a synthetic resin of the acrolein type derived from coal tar. It is a thermoplastic resin, readily softening at about 248° F. and can be sprayed. It can be machined, turned, curved and cut, and has a very high tensile strength and a high resistance to water. It is not affected by dilute acids, is resistant to alkalies and alcohols, and capable of being cemented. In the trade in Great Britain this resin is known and sold under the trade-name of "Resin—M."

Other resins can be used. For instance, urea-formaldehyde condensation products known under the trade-name of "Pollopas," "Plastopal," and "Shellan" are understood to have the desired optical and transparent properties. Such resins are clear, transparent and colorless, as glass.

Fig. 4 shows a multi-layer polarizing body composed of alternate layers of glass (preferably) and an extremely thin transparent metal having an index different from glass. The metal is preferably chosen to have a melting point above that of glass. Suitable metals are platinum, silver and gold. These layers, like those of Figs. 1 and 3, may, if desired, be deposited by spraying. The spraying of the metal is achieved by heating same in a burner and depositing the metal by means of a nozzle, in known manner, as for example, note United States Patents Nos. 1,128,059, Schoop, patented February 9, 1915, and 2,053,923, Stewart, patented September 8, 1936. The metal layers of Fig. 4 can also be deposited by cathode sputtering, and painting, in known manner.

It should be understood that the forms of the multi-layer polarizing bodies of Figs. 1, 3 and 4 are to be considered as illustrative of the invention, and not by way of limitation; the important aspect being that by the spraying operation I can obtain extremely thin layers and extremely thin finished multi-layer polarizing bodies. In all three of these embodiments it is preferably desired that the transition plane between any two adjacent layers have a thickness less than the wavelength of light. One way by which this may be done with glass, given here by way of example only, is to spray the first layer of glass with an extremely thin layer of optically transparent metal of higher melting point than the glass. This metal will fuse into the layer of glass upon which it is sprayed. If the metal layer is now polished to provide a very smooth and even surface, and another layer of glass (either of the same optical density as the first or a different optical density) of a melting point less than that of the metal is now sprayed onto the metal layer, there will not be the same degree of fusion between the glass and metal as in the first instance, but sufficient adhesion to produce a unitary structure. The transition plane between the metal layer and the second glass layer can thus be made to have a thickness less than the wavelength of light. Suitable cooling of the layers by a gas will hasten the manufacture of the polarizer. By repeating the foregoing operations, a polarizer of the desired number of layers of glass alternating with metal may be had. The finished polarizer of Figs. 1, 3 and 4 will comprise a unitary structure, wherein adjacent layers adhere firmly to each other, without the need for any adhesive.

Although I have described, in Fig. 1, a light polarizer having a layer made of one kind of glass alternating with a layer of another kind of glass, in Fig. 3 a layer of resin alternating with another layer of resin or cellulosic product, and in Fig. 4 a layer of glass alternating with a layer of metal, it should be understood that the polarizer of my invention can be made by arranging layers of glass or synthetic resin to alternate with layers of any other suitable materials having good optical properties and having a different index of refraction than said first layers. It is preferred, though not necessary, that one of the materials used for the multi-layer polarizer have an index of refraction as near that of air as possible. For this reason, an alternative multi-layer light polarizer construction to that of Fig. 1 can be made of alternate layers of glass and some suitable transparent optical material having an index of refraction almost like that of air.

Fig. 5 illustrates one way in which a multi-layer light polarizing body in accordance with my invention can be used as a spectacle lens. For this purpose, it is proposed that the layers of my polarizing body (preferably that of Fig. 1) be built up so that a thin slab can be cut out therefrom at the proper polarizing angle (in the case of certain kinds of glass, around 45° to 60°, more or less) and this slab inserted in the center of each spectacle lens. Since the center portion of each spectacle lens is the main portion used for observation purposes, a polarizing body at this location will polarize most all of the light striking the eye of the user.

In Fig. 5, the spectacle lenses are labeled 14, 14 in the center of each there being a circular disc 14' made from a slab of my polarizing body cut at the proper angle from a substantially thick multi-layer polarizer made in accordance with the invention. Lenses 14, 14 are preferably made from a material having a single optical density, such as one kind of glass. These lenses 14, 14 are held in place by rims 15, 15, in turn connected together by the nose member 16. Temple pieces 17, 17 support the spectacle frame on the face of the wearer. It will be appreciated, of course, that polarizing body 14' may have other shapes and have other locations in the lens 14, and may have relatively larger or smaller dimensions than are shown in the drawing.

The multi-layer polarizer of my invention finds particular application in glare elimination in automobiles, although it is not limited thereto, and may be used wherever there is need for a light polarizer, it being borne in mind, however, that my polarizer should be positioned at the proper polarizing angle. When used in automobiles, my polarizer can be used in the windshield or in the headlights, or in both.

What is claimed is:

1. A multi-layer light polarizing body comprising a unitary structure composed of superimposed layers of optically transparent resinous material, which are fused together at all points over their adjacent surfaces and have a smooth transition plane between said surfaces, adjacent layers having different indexes of refraction, alternate layers having the same index of refraction, said body having a sufficient number of layers to substantially completely polarize light passing therethrough at the polarizing angle.

2. A multi-layer light polarizing body comprising a unitary structure composed of superimposed transparent layers of different refractive indices, said layers being fused together uniformly at all points over their adjacent surfaces and having a smooth transition plane between said surfaces, there being a sufficient number of layers to substantially completely polarize light passing therethrough at the polarizing angle.

3. A multi-layer light polarizing body comprising a unitary structure composed of superimposed transparent layers of different refractive indices, said layers being fused together at all points over their adjacent surfaces and having a transition plane, the transition plane between the surface of one layer and the adjacent surface of the adjacent layer having a thickness less than the wavelength of light, there being a sufficient number of layers to substantially completely polarize light passing therethrough at the polarizing angle.

4. The process of fabricating a multi-layer light polarizing body which includes depositing increments of an optically transparent synthetic plastic material to form a layer, and depositing upon said layer, in direct contact therewith at all points, increments of another optically transparent synthetic plastic material having a different index of refraction to form a superimposed layer and having a desired transition plane between said layers, and repeating said last steps in the same sequence to form a resultant multi-layer body which substantially completely polarizes light passing therethrough at the polarizing angle and which has alternate layers of the same index of refraction and adjacent layers of different index of refraction.

5. The process of fabricating a multi-layer light polarizing body which includes depositing increments of an optically transparent material to form a layer, and depositing upon said layer, in direct contact therewith at all points, increments of another optically transparent material having a different index of refraction to form a superimposed layer and having a desired transition plane between said layers, and repeating said last steps in the same sequence to form a resultant multi-layer body which substantially completely polarizes light passing therethrough at the polarizing angle and which has alternate layers of the same index of refraction and adjacent layers of different index of refraction.

LEON POLLACK.